US007953601B2

(12) United States Patent
Pickering

(10) Patent No.: US 7,953,601 B2

(45) **Date of Patent: *May 31, 2011**

(54) METHOD AND APPARATUS FOR PREPARING A DOCUMENT TO BE READ BY TEXT-TO-SPEECH READER

(75) Inventor: John B. Pickering, Hampshire (GB)

(73) Assignee: Nuance Communications, Inc., Burlington, MA (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/339,803

(22) Filed: Dec. 19, 2008

(65) Prior Publication Data

US 2009/0099846 A1 Apr. 16, 2009

Related U.S. Application Data

(63) Continuation of application No. 10/606,914, filed on Jun. 26, 2003, now Pat. No. 7,490,040.

(30) Foreign Application Priority Data

Jun. 28, 2002 (GB) .................................. 0215123.1

(51) Int. Cl.

| | |
|---|---|
| *G06F 17/27* | (2006.01) |
| *G10L 13/00* | (2006.01) |
| *G10L 13/08* | (2006.01) |
| *G10L 21/00* | (2006.01) |

(52) U.S. Cl. ............ 704/260; 704/9; 704/258; 715/256; 715/727

(58) Field of Classification Search .................. 704/260
See application file for complete search history.

(56) References Cited

U.S. PATENT DOCUMENTS

| | | | |
|---|---|---|---|
| 5,860,064 | A | 1/1999 | Henton |
| 6,081,774 | A | 6/2000 | de Hita et al. |
| 6,122,647 | A | 9/2000 | Horowitz et al. |
| 6,549,883 | B2 | 4/2003 | Fabiani et al. |
| 6,622,140 | B1 | 9/2003 | Kantrowitz |
| 6,865,572 | B2 | 3/2005 | Boguraev et al. |
| 6,947,893 | B1 | 9/2005 | Iwaki et al. |
| 7,103,548 | B2 | 9/2006 | Squibbs et al. |
| 7,191,131 | B1 | 3/2007 | Nagao |
| 2004/0111271 | A1 | 6/2004 | Tischer |

*Primary Examiner* — Justin W Rider

(74) *Attorney, Agent, or Firm* — Wolf, Greenfield & Sacks, P.C.

(57) ABSTRACT

There is disclosed a method and system for preparing a document to be read by a text-to-speech reader. The method can include identifying two or more voice types available to the text-to-speech reader, identifying the text elements within the document, grouping related text elements together, and classifying the text elements according to voice types available to the text-to-speech reader. The method of grouping the related text elements together can include syntactic and intelligent clustering. The classification of text elements can include performing latent semantic analysis on the text elements and characteristics of the available voice types.

16 Claims, 6 Drawing Sheets

| Text Elements | <Voice Type> |
|---|---|
| Local News<br>An announcement was made yesterday by the government.<br>the minister announced,<br>A spokesman for the opposition denied this. | Neutral, authoritative, formal<br><Voice 1> |
| "Our commitment to the people of this area has increased in real terms" | Politician<br><Voice 4> |
| "Nonsense" | Neutral, authoritative, formal<br><Voice 1*> |
| John<br>Happy Birthday<br>Jill<br>Sad News | Informal<br><Voice 2> |
| Buy, buy, buy – everything must go<br>Only two more days to go | Enthusiastic<br><Voice 3> |

| Voice Type Indicator 32 | Voice Type Characteristics 34 |
|---|---|
| 1 | Neutral, authoritative, formal, news reader |
| 2 | Informal, friendly |
| 3 | Enthusiastic, advertiser |
| 4 | Politician |

FIG. 3

| Text Elements | <Voice Type> |
|---|---|
| Local News<br>An announcement was made yesterday by the government.<br>the minister announced,<br>A spokesman for the opposition denied this. | Neutral, authoritative, formal<br><Voice 1> |
| "Our commitment to the people of this area has increased in real terms" | Politician<br><Voice 4> |
| "Nonsense" | Neutral, authoritative, formal<br><Voice 1*> |
| John<br>Happy Birthday<br>Jill<br>Sad News | Informal<br><Voice 2> |
| Buy, buy, buy – everything must go<br>Only two more days to go | Enthusiastic<br><Voice 3> |

FIG. 5

METHOD AND APPARATUS FOR PREPARING A DOCUMENT TO BE READ BY TEXT-TO-SPEECH READER

CROSS-REFERENCE TO RELATED APPLICATIONS

This application is a continuation of, and accordingly claims the benefit of, U.S. patent application Ser. No. 10/606,914, filed with the U.S. Patent and Trademark Office on Jun. 26, 2003, which claims priority to United Kingdom Application No. 0215123.1, filed Jun. 28, 2002, now U.S. Pat. No. 7,490,040.

BACKGROUND

1. Field of the Invention

This invention relates to a method and apparatus for preparing a document to be read by a text-to-speech reader. In particular the invention relates to classifying the text elements in a document according to voice types of a text-to-speech reader.

2. Description of the Related Art

In a number of different areas, such as voice access to the Internet, 'reading' textual information for the blind, and creating audio versions of newspapers, there is a significant problem in ensuring that appropriate attention can be drawn to the sections in a given document and the information they contain. One important attentional cue under such circumstances is a change of voice, for instance from male to female voice. In auditory terms, this has the effect of highlighting that something has changed in the informational content.

Machine-readable documents are a mixture of both markup tags, paragraph markers, page breakers, lists and the text itself. The text may further use tags or punctuation marks to provide fine detailed structure of emphasis, for instance, quotation marks and brackets or changing character weight to bold or italic. Furthermore, VoiceXML tags in a document describe how a spoken version should render the structural and informational content.

One example of such voice-type switching would be a VoiceXML home page with multiple windows and sections. Each window or section line or section of a dialogue may be explicitly identified as belonging to a specific voice.

A problem with VoiceXML pages is that the VoiceXML tags need to be inserted into a document by the document designer.

Previously, methods have highlighted grouping content together to drive voice-type selection on the basis of document structure alone. In this way, tables for example can be read out intelligently. However, such systems do not supplement this structuring with thematic information to complete the groupings or the better to select appropriate voice characteristics for output.

SUMMARY OF THE INVENTION

According to a first aspect of the present invention there is provided a method for preparing a document to be read by a text-to-speech reader. The method can include: identifying two or more voice types available to the text-to-speech reader; identifying the text elements within the document; grouping similar text elements together; and classifying the text elements according to voice types available to the text-to-speech reader.

Such a solution allows for the automatic population of a document with voice tags thereby voice enabling the document.

BRIEF DESCRIPTION OF THE DRAWINGS

Embodiments of the invention will now be described, by means of example only, with reference to the accompanying drawings in which:

FIG. 3 is an example table of voice type characteristics;

FIG. 5 is an example table of how the source document is classified; and

DETAILED DESCRIPTION OF THE INVENTION

Figure 1:
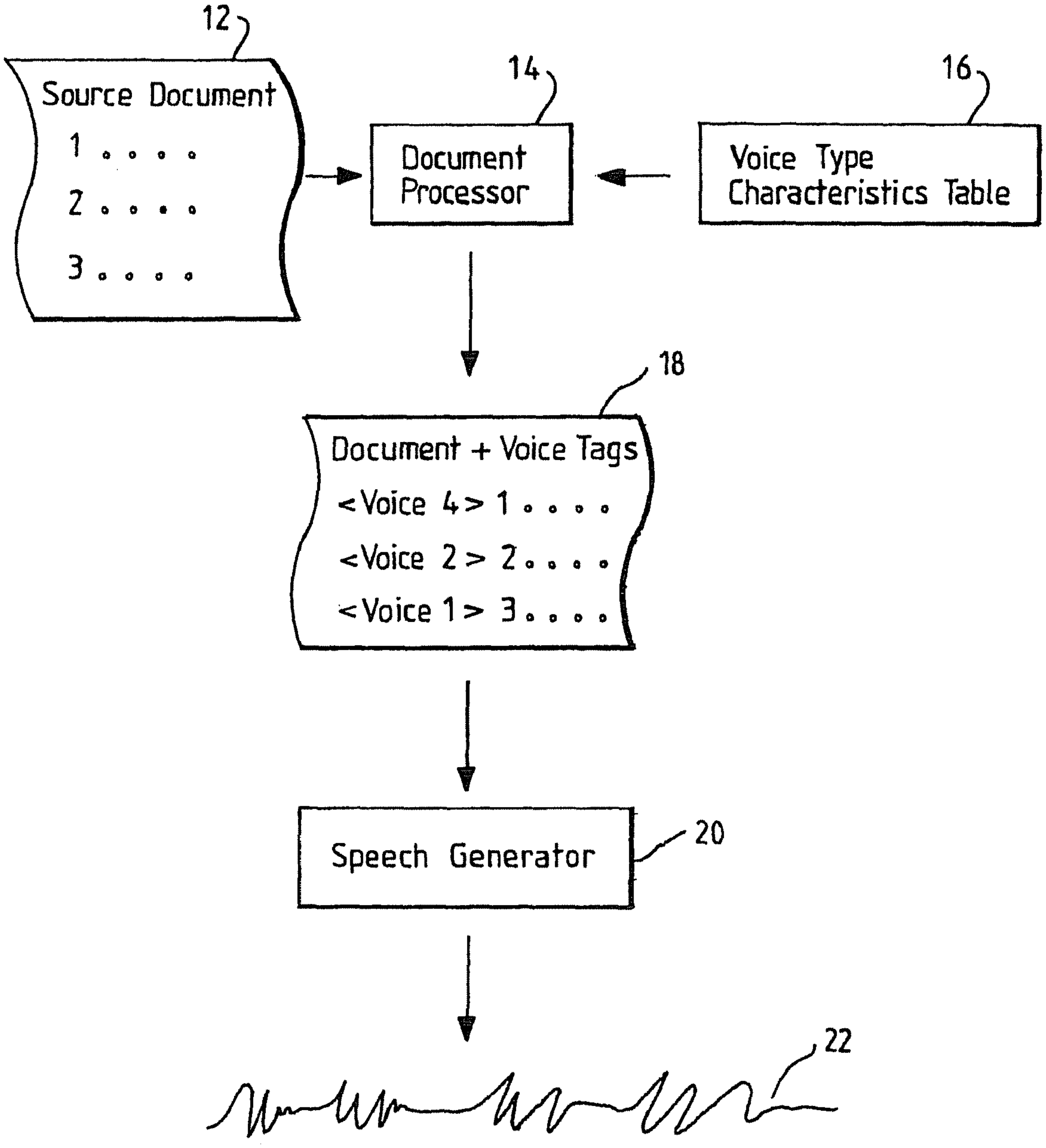
FIG. 1 is a schematic diagram of a source document; a document processor; a voice type characteristic table; and a speech generation unit used in the present embodiment.

Referring to FIG. 1 there is shown a schematic diagram of a source document 12; a document processor 14; a voice type characteristic table 16; a voice tagged document 18; and a speech generator 20 used to deliver the final speech output 22. The source document 12 and voice type characteristics table 16 are input into the document processor 14. The document 12 is processed and a voice tagged document 18 is output. The speech generator 20 receives the voice tagged document 18 and performs text-to-speech under the control of the voice tags embedded in the document.

Figure 2:
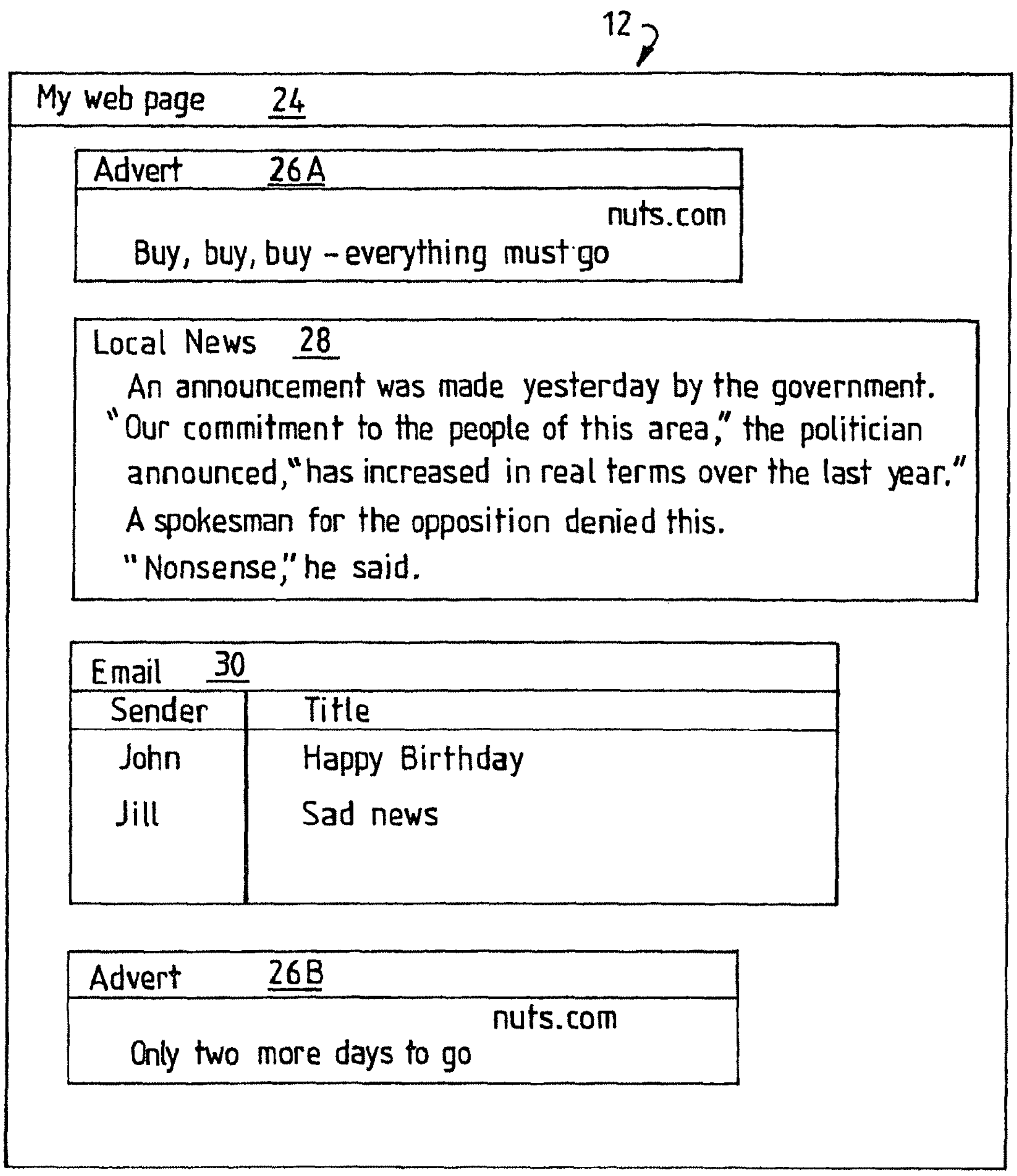
FIG. 2 is a schematic diagram of a source document.

Referring to FIG. 2, the example source document 12 is a personal home page 24 comprising three different types of windows. The first and last windows are adverts 26A and 26B, the second window is a news window 28 and the third window is an email inbox window 30. The adverts 26A and 26B in this example are both for a product called Nuts.

Referring to FIG. 3, the voice type characteristic table 16 comprises a column for the voice type identifier 32 and a column for the voice type characteristics 34. In this example voice type 1 is a neutral, authoritative, formal voice like a news reader's; voice type 2 is an informal voice which is friendlier than voice 1; voice type 3 is an enthusiastic voice suitable for advertisements; voice 4 is a particular voice belonging to a personality, in this case the politician quoted in the news item of the news window.

Figure 4:
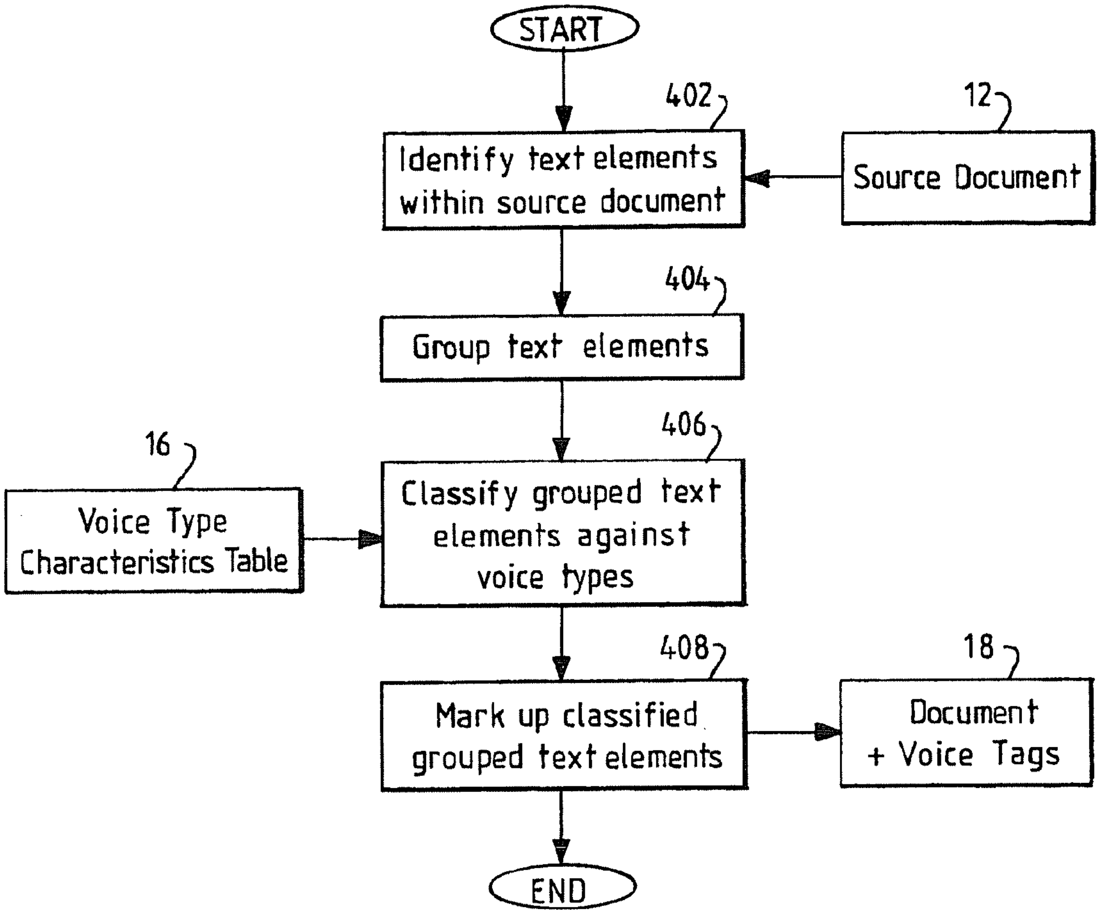
FIG. 4 is a flow diagram of the steps in the document processor.

Referring to FIG. 4, a flow diagram of the steps in the document processor is shown. Step 402 identifies all the text elements within the source document 12. Step 404 groups similar text elements together. Step 406 classifies the grouped text elements against the voice type characteristics 34. Step 408 marks up the classified grouped text elements within the source document 12 with voice type identifiers 32. It is this marked-up source document 18 that is passed on to the speech generator.

Referring to step 402, the identification of all the text elements is performed by a structural parser (not shown). The structural parser is responsible for establishing which sections of the text belong in separate gross sections. It subdivides the complete text into generic sections: this would be analogous to chapters or sections in a book or in this case the separate windows or frames in the document. Gross structural subdivisions such as the frames are marked with sequenced tags <s1> . . . <sN>. Next, individual paragraphs are marked with sequenced tags <p1> . . . <pN>. Next, individual text elements within the paragraph are marked with sequential tags <t1> . . . <tN>. Individual elements include explicit quotations keyed of the orthographic convention of using quotation marks. Also included is a definition keyed off the typographical convention of italicizing or otherwise changing character properties for a run of more than a single word. Further included may be a list keyed by the appropriate mark-up convention, for instance, <o1> . . . </o1> in HTML with each list item marked with <li>.

The structural parser creates a hierarchical tree showing the text elements and gross sections. In essence, the structural parser simply collates all of the information available from the existing mark-up tags, document structure and document orthography.

Referring to step 404, the grouping of similar text items together is performed by a thematic parser (not shown) that identifies which of these sections actually belongs together. In the preferred embodiment the thematic parser initially performs a syntactic parse and secondly uses text-mining techniques to group the text elements. In other embodiments step 404 may be performed by either of syntactic parse or text mining. Based on the results of the text mining and syntactic parses, thematic groupings can be made to show which text elements belong to the same topic. In the example given, the two advert frames 26A and 26B need to be linked as they are for the same product or service. If they were for different products or services the same voice type may be used but could be altered to distinguish the two adverts. Alternatively a different voice could be used.

The inclusion of some degree of syntactic parsing at least for grouping of themes works less efficiently across broader text ranges such as non-sequential paragraphs than it does in the same paragraph. However, it would provide a useful indication of where two non-sequential text elements are related. Take a possible quotation reported in a news broadcast:

"Our commitment to the people of this area," the politician announced, "has increased in real terms over the last year".

The structural parser would have identified (based on the opening and closing quotation marks) two text elements: "Our commitment to the people of this area," and "has increased in real terms over the last year". Clearly, however, the latter is simply a continuation of the former, and the two text elements should be treated as dependent. A syntactic parse links these two text elements to be treated as single text element in the remainder of the embodiment. Similarly text elements within sentences without embedded quotations are linked and treated as one. Sentences within a paragraph are similarly linked and treated as one unit.

The text mining grouping works more efficiently across broader text ranges and, in this embodiment, groups the text elements according to themes found within the text elements. In another embodiment the themes could be a predefined group list such as: adverts, emails, news, and personal. Clearly the pre-defined group list is unlimited. Furthermore, text mining grouping works best with larger sets of words so is best performed after the structural parse.

The result of the thematic parse is to identify sections of text that belong together, whether they are adjacent or distributed across a document. Each text element from the hierarchical tree is now in a group of similar text elements as shown in FIG. 5.

The set of text elements is input into a clustering program. Altering the composition of the input set of text elements will almost certainly alter the nature and content of the clusters. The clustering program groups the documents in clusters according to the topics that the document covers. The clusters are characterized by a set of words, which can be in the form of several word-pairs. In general, at least one of the word-pairs is present in each document comprising the cluster. These sets of words constitute a primary level of grouping.

In the described embodiment, the clustering program used is IBM Intelligent Miner for Text provided by International Business Machines Corporation. This is a text-mining tool that takes a collection of text elements in a document and organizes them into a tree-based structure, or taxonomy, based on a similarity between meanings of text elements.

The starting point for the IBM Intelligent Miner for Text program are clusters which include only one text element and these are referred to as "singletons". The program then tries to merge singletons into larger clusters, then to merge those clusters into even larger clusters, and so on. The ideal outcome when clustering is complete is to have as few remaining singletons as possible.

If a tree-based structure is considered, each branch of the tree can be thought of as a cluster. At the top of the tree is the biggest cluster, containing all the text-elements. This is subdivided into smaller clusters, and these into still smaller clusters, until the smallest branches that contain only one text element (or effective text element). Typically, the clusters at a given level do not overlap, so that each text element appears only once, under only one branch.

The concept of similarity of text elements requires a similarity measure. A simple method would be to consider the frequency of single words, and to base similarity on the closeness of this profile between documents. However, this would be noisy and imprecise due to lexical ambiguity and synonyms. The method used in IBM's Intelligent Miner for Text program is to find lexical affinities within the text element. In other words, correlations of pairs of words appearing frequently within short distances throughout the document.

A similarity measure is then based on these lexical affinities. Identified pairs of terms for a text element are collected in term sets, these sets are compared to each other and the term set of a cluster is a merge of the term sets of its sub-clusters.

Other forms of extraction of keywords can be used in place of IBM's Intelligent Miner for Text program. The aim is to obtain a plurality of sets of words that characterize the concepts represented by the text elements.

Referring to step 406, the classifying of the grouped text elements against voice types is performed by a pragmatic parser (not shown). The pragmatic parser matches each group of text elements to a voice type characterization using a text comparison method. In the preferred embodiment this method is Latent Semantic Analysis (LSA) again performed by IBM Intelligent Miner for Text. With LSA each existing group of text elements is classified using the voice types as categories. Having keywords in the voice type characterization 34 helps this process.

In the preferred embodiment keywords for the type of text element grouping are used. For instance, putting the words "news reader, news item, news article" in the voice type classification 34 for voice type 1 helps the classifying process match news articles against voice type 1 which is suitable for reading news articles. Other types would include adverts, email, personal column, reviews, and schedules. These keywords are placed in the voice type characterization 34 for the particular voice that the words refer to.

In another embodiment the pragmatic parser will look for intention in the text element groups and intentional words are placed in the voice type characterization 34. For instance, voice one is characterized as neutral, authoritative and formal, the LSA will match the text element grouping that best fits this characterization.

Voice type 5 is a special case of the type of text element grouping. Voice type 5 impersonates a particular politician and the politician's name is in the voice type characterization 34. The thematic parser will pick up if a particular person says the quotations and the pragmatic parser will match the voice to the quotation.

Latent Semantic Analysis (LSA) is a fully automatic mathematical/statistical technique for extracting relations of expected contextual usage of words in passages of text. This process is used in the preferred embodiment. Other forms of Latent Semantic Indexing or automatic word meaning comparisons could be used.

LSA used in the pragmatic parser has two inputs. The first input is a group of text elements. The second input is the voice type characterizations. The pragmatic parser has an output that provides an indication of the correlation between the groups of text elements and the voice type characterizations.

Although a reader does not need to understand the internal process of LSA in order to put the invention into practice, for the sake of completeness a brief overview of the LSA process within the automated system is given.

The text elements of the document form the columns of a matrix. Each cell in the matrix contains the frequency with which a word of its row appears in the text element. The cell entries are subjected to a preliminary transformation in which each cell frequency is weighted by a function that expresses both the word's importance in the particular passage and the degree to which the word type carries information in the domain of discourse in general.

The LSA applies singular value decomposition (SVD) to the matrix. This is a general form of factor analysis that condenses the very large matrix of word-by-context data into a much smaller (but still typically 100-500) dimensional representation. In SVD, a rectangular matrix is decomposed into the product of three other matrices. One component matrix describes the original row entities as vectors of derived orthogonal factor values, another describes the original column entities in the same way, and the third is a diagonal matrix containing scaling values such that when the three components are matrix-multiplied, the original matrix is reconstructed. Any matrix can be so decomposed perfectly, using no more factors than the smallest dimension of the original matrix.

Each word has a vector based on the values of the row in the matrix reduced by SVD for that word. Two words can be compared by measuring the cosine of the angle between the vectors of the two words in a pre-constructed multidimensional semantic space. Similarly, two text elements each containing a plurality of words can be compared. Each text element has a vector produced by summing the vectors of the individual words in the passage.

In this case the text elements are a set of words from the source document. The similarity between resulting vectors for text elements, as measured by the cosine of their contained angle, has been shown to closely mimic human judgments of meaning similarity. The measurement of the cosine of the contained angle provides a value for each comparison of a text element with a source text.

In the pragmatic parser a set of voice type characterization words and a group of text elements are input into an LSA program. For example, the set of words "neutral, authoritative, formal" and the words of a particular text element group are input. The program outputs a value of correlation between the set of words and the text element group. This is repeated for each set of voice characterizations and for each text element group text in a one to one mapping until a set of values is obtained.

Referring to FIG. 5, the grouping of the text elements after processing is shown followed by the classification. The first grouping is the news narrative in the Local News Window 28 which is classified with voice type 1. The next grouping is the statements by the politician classified by voice type 4. The next grouping is the statement made by the opposition for which there is no set voice and voice type 1* is used. In this case the nearest voice is matched and marked with a '*' to indicate that a modification to the voice output should be made when reading to distinguish it from nearest voice.

Modification would be effected as follows. For a full TTS system for speech output, the prosodic parameters relating to segmental and supra-segmental duration, pitch and intensity would be varied. If the mean pitch is varied beyond half an octave then distortion may occur so normalization of the voice signal would be effected. For pre-recorded audio output, the source characteristics of, for instance, Linear Predictive Coding (LPC) analysis would be modified in respect of pitch only, limited to mean pitch value differences of a third an octave.

The next grouping is the text in the Email Inbox Window 30 and voice type 2 is assigned. The last grouping is the adverts 26A, 26B and voice type 3 is assigned to both adverts which are treated as one text element.

Figure 6:
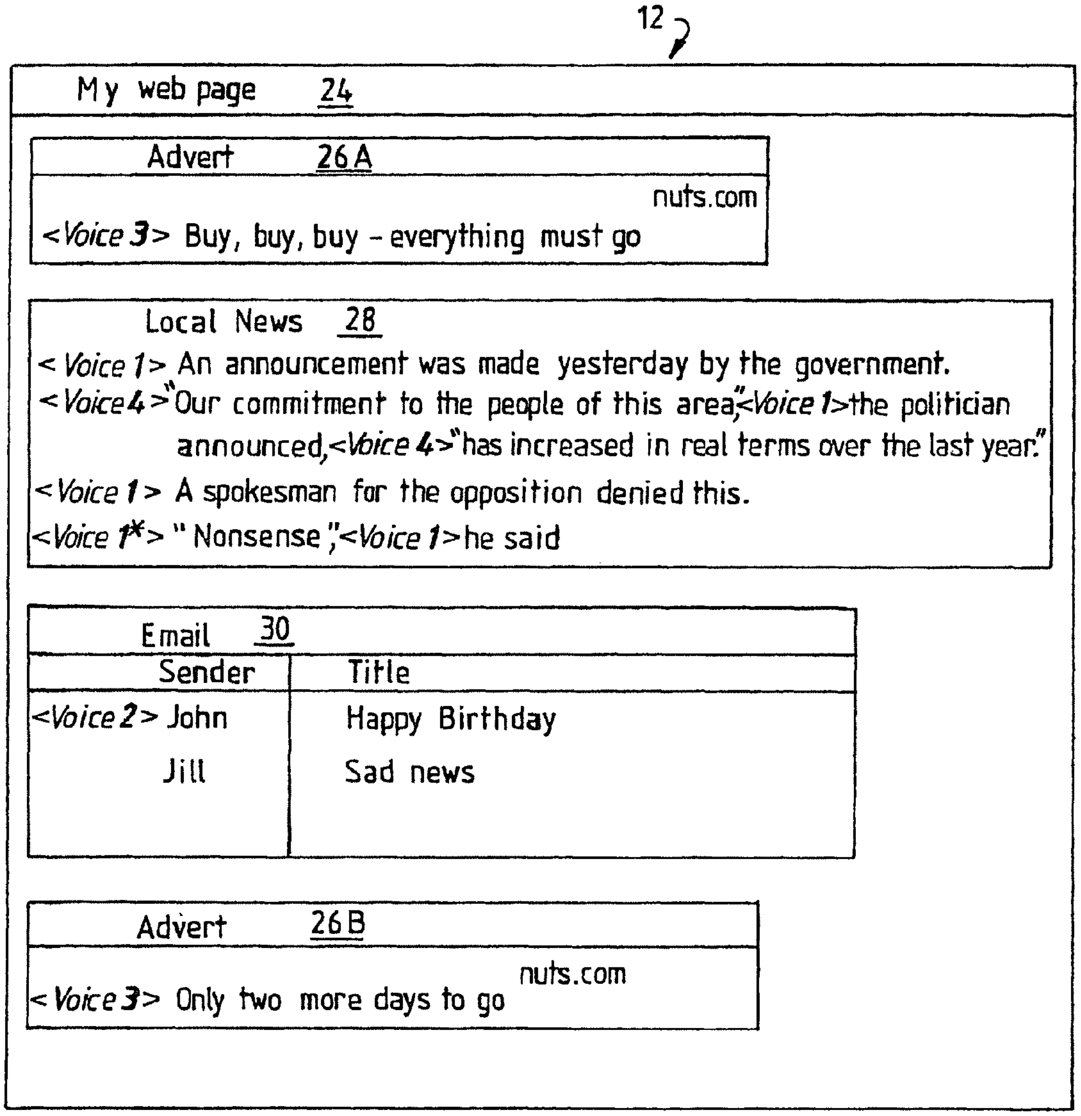
FIG. 6 is an example of the source document with inserted voice tags.

Referring to FIG. 6, the voice tags are show between '<' '>' symbols. The adverts both have <voice3> tags preceding them. The email window has a <voice2> tag preceding the text. The Local News window has a mixture of <voice1>, <voice1*> and <voice4> tags.

What is claimed is:

1. A system for automatically marking a document to be read by a text-to-speech reader with voice type identifiers, said system comprising:

at least one processor programmed to:

identify two or more voice types available to the text-to-speech reader, each voice type having a corresponding voice type identifier;

identify text elements within the document by marking gross structural subdivisions of text with a first set of sequenced tags, marking individual paragraphs of the text with a second set of sequenced tags, and marking text elements with a third set of sequenced tags to generate a hierarchical tree identifying the text elements;

group similar text elements together by generating one or more clusters according to each identifiable topic of the document, and by syntactically parsing the document and subsequently performing text mining to determine which text elements in the document are similar, wherein similarity is based upon lexical affinities among the text elements;

classify the grouped text elements according to voice types available to the text-to-speech reader; and mark the classified grouped text elements within the document with corresponding voice type identifiers.

2. The system as claimed in claim 1, wherein the at least one processor is programmed to identify text elements by breaking down the document into elements and by separating out the text elements.

3. The system as claimed in claim 1, wherein the at least one processor is programmed to group similar text elements together by parsing for structural features of the text elements.

4. The system as claimed in claim 3, wherein the structural features of the text elements include at least one feature selected from the group consisting of: the position of the text element in the document, the syntax of the text element, and text features within the text element.

5. The system as claimed in claim 3, wherein the at least one processor is programmed to group similar text elements by parsing for thematic features of the text elements.

6. The system as claimed in claim 1, wherein the at least one processor is programmed to classify the text elements according to the available voice types by finding the best match between the grouped text elements and the characteristics of the voice types.

7. The system as claimed in claim 6, wherein the at least one processor is programmed to classifying the text elements according to the characteristics of the available voice types by identifying similar themes within the text elements and voice types.

8. The system as claimed in claim 6, wherein the at least one processor is programmed to classify the text elements according to the characteristics of the available voice types by identifying similar intentions within the text elements and voice types.

9. A non-transitory computer-readable storage medium, encoded with computer program instructions that, when executed by a machine, cause the machine to perform a method for automatically marking a document to be read by a text-to-speech reader with voice type identifiers, the method comprising:

identifying two or more voice types available to the text-to-speech reader, each voice type having a corresponding voice type identifier;

identifying text elements within the document, wherein identifying text elements comprises marking gross structural subdivisions of text with a first set of sequenced tags, marking individual paragraphs of the text with a second set of sequenced tags, and marking text elements with a third set of sequenced tags to generate a hierarchical tree identifying the text elements;

grouping similar text elements together, wherein grouping comprises generating one or more clusters according to each identifiable topic of the document, syntactically parsing the document and subsequently performing text mining to determine which text elements in the document are similar, wherein similarity is based upon lexical affinities among the text elements;

classifying the grouped text elements according to voice types available to the text-to-speech reader; and marking the classified grouped text elements within the document with corresponding voice type identifiers.

10. The non-transitory computer-readable storage medium as claimed in claim 9, wherein identifying text elements further comprises breaking down the document into elements and code for separating out the text elements.

11. The non-transitory computer-readable storage medium as claimed in claim 9, wherein grouping similar text elements together further comprises parsing for structural features of the text elements.

12. The non-transitory computer-readable storage medium as claimed in claim 11, wherein the structural features of the text elements include at least one feature selected from the group consisting of: the position of the text element in the document, the syntax of the text element, and text features within the text element.

13. The non-transitory computer-readable storage medium as claimed in claim 11, wherein grouping similar text elements together further comprises parsing for thematic features of the text elements.

14. The non-transitory computer-readable storage medium as claimed in claim 9, wherein classifying the text elements according to the available voice types further comprises finding the best match between the grouped text elements and the characteristics of the voice types.

15. The non-transitory computer-readable storage medium as claimed in claim 14, wherein classifying the text elements according to the characteristics of the available voice types further comprises identifying similar themes within the text elements and voice types.

16. The non-transitory computer-readable storage medium as claimed in claim 14, wherein classifying the text elements according to the characteristics of the available voice types further comprises identifying similar intentions within the text elements and voice types.

* * * * *

UNITED STATES PATENT AND TRADEMARK OFFICE

CERTIFICATE OF CORRECTION

PATENT NO. : 7,953,601 B2
APPLICATION NO. : 12/339803
DATED : May 31, 2011
INVENTOR(S) : John Brian Pickering It is certified that error appears in the above-identified patent and that said Letters Patent is hereby corrected as shown below:

In the Claims:

At column 7, claim 7, line 10, please change “classifying” to -- classify --.

Signed and Sealed this
Ninth Day of August, 2011

David J. Kappos
*Director of the United States Patent and Trademark Office*